May 6, 1941.   H. C. BROCKMEIER   2,240,832
EGG RACK
Filed Aug. 18, 1939   2 Sheets-Sheet 2
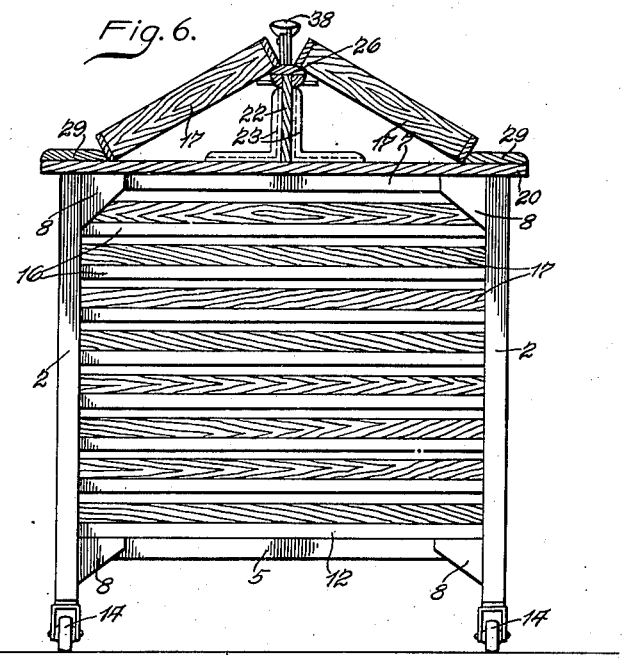
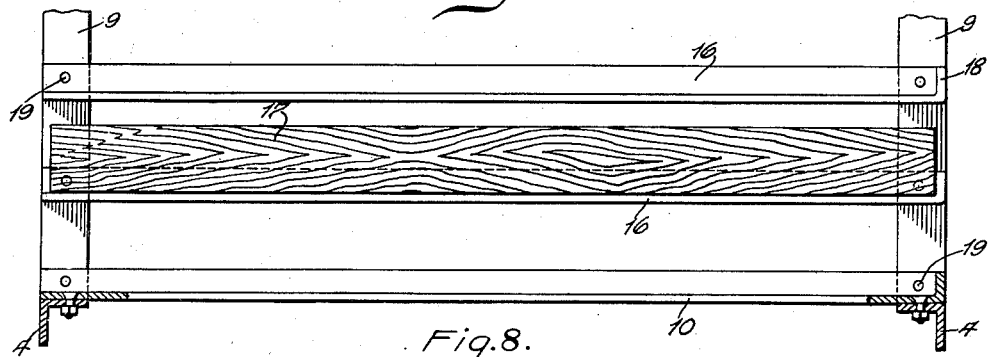
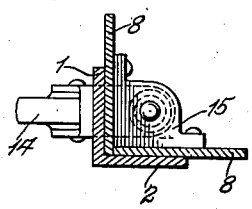
Inventor
Hilbert C. Brockmeier
by John D. Rippey
His Attorney Patented May 6, 1941

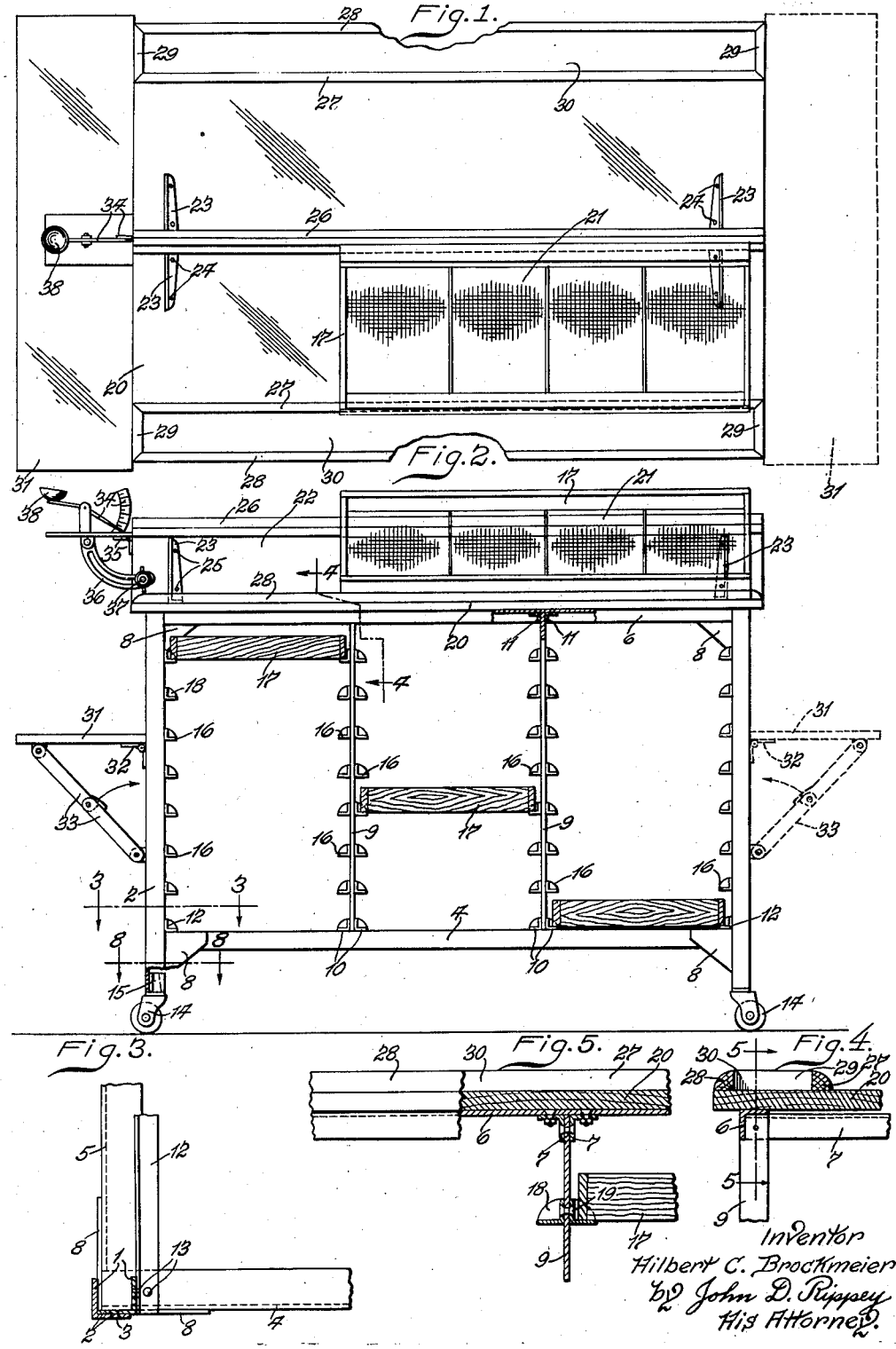

2,240,832

UNITED STATES PATENT OFFICE 2,240,832

EGG RACK

Hilbert C. Brockmeier, Edwardsville, Ill.

Application August 18, 1939, Serial No. 290,753

1 Claim. (Cl. 211—71)

This invention relates to egg racks; and has special reference to movable or portable racks adapted for use in hatcheries.

An object of the invention is to provide an improved movable or portable rack having therein series of pairs of supports for egg trays containing eggs and adapted to be placed in an incubator, and means for supporting the trays in inclined position during placing of the eggs therein.

Another object of the invention is to provide an improved egg rack of the character and for the purpose mentioned having means for retaining a tray in an inclined position during the placing of the eggs in the tray, and arranged to receive and retain eggs that are not selected for hatching and, as a consequence, are not placed in the tray.

Another object of the invention is to provide an improved egg rack of the character mentioned having means for weighing the individual eggs so that eggs within a standard range of weight and size may be selected.

Other objects will appear from the following description, reference being made to the annexed drawings, in which—

Fig. 1 is a plan view of my improved egg rack.

Fig. 2 is a side elevation thereof.

Fig. 3 is an enlarged sectional view on the line 3—3 of Fig. 2, showing a portion of the frame structure.

Fig. 4 is an enlarged sectional view on the line 4—4 of Fig. 2.

Fig. 5 is a detail sectional view on the line 5—5 of Fig. 4.

Fig. 6 is an end elevation of the egg rack.

Fig. 7 is an enlarged cross-sectional view of the lower portion of the frame showing the arrangement of the support for the trays.

Fig. 8 is an enlarged sectional view on the line 8—8 of Fig. 2.

The frame of the egg rack is preferably composed of angular metal bars including four corner upright members connected near their lower and upper ends by horizontal members. As shown, the upright corner members are of channel form excepting for short portions at their lower ends. Each corner member comprises a pair of parallel side portions 1 arranged in rigid relationship. As shown, the side portions 1 are parts of two separate angle bars having their sides 2 overlapping and rigidly attached by fasteners 3, or otherwise as desired (Fig. 3). It is immaterial in what manner the portions 1 are made rigid with each other.

The upright members at the corners are rigidly connected near their lower ends by a pair of side angle bars 4 and a pair of end angle bars 5; and, at their upper ends, by side angle bars 6 and end angle bars 7. The ends of the bars 4, 5, 6 and 7 are further rigidly connected with the upright angle bars by triangular plates 8, excepting that the triangular plates 8 are omitted from the front upper corners (Fig. 2).

Vertical bars 9 have their lower ends rigidly attached to the lower angle bars 4 and their upper ends rigidly attached to the upper angle bars 6 of the frame. As shown, the lower end of each bar 9 is confined between two parallel angle bars 10, which are rigidly attached to said bars 9 and also to the bars 4, and the upper end of each bar 9 is confined between two angle bars 11 rigidly attached to said bars 9 and to the upper frame bars 6. The bars 11 are concealed between the outer downwardly extended flanges of the angle bars 6. Angle bars 12 complementary to the angle bars 10 have their ends rigidly attached to the angle bars 4 and to the portions 1 of the corner uprights by fasteners 13. Thus, a rigid relatively light movable and portable frame is provided, the same being supported upon caster rollers 14 swiveled in sockets 15 attached to the inner sides of the lower ends of the corner uprights.

A number of pairs of horizontal angle bars 16 are attached to opposite sides of the bars 9 and to the inner sides of the corner uprights. The bars 16 are parallel with each other and with the bars 10 and 11, and the bars of each pair of bars 16 have their lower horizontal flanges extending toward each other and constituting supports for egg trays 17, which may be slid into and from the rack. The rear ends of the angle bars 10 and 16 are formed with abutments 18 for the trays 17 when the latter are slid onto the supporting bars. The bars 10 and 16 are rigidly attached to the bars 9 and to the corner uprights by counter-sunk fasteners 19, so that no objectionable projections exist to interfere with the free sliding movements of the egg trays into and from the rack.

The top 20 of the rack seats upon and is attached to the inwardly extended flanges of the bars 6 and 7 at the upper end of the frame. The top may be of wood or other appropriate material, and preferably has its side and end edges extending beyond the metallic frame. The length of the frame is greater than the length of the trays 17, which may be of standard construction including open screen bottoms 21. A relatively vertical support 22 extends longitudinally along the top 20 midway between the sides thereof, and is rigidly supported by a number of angular brackets 23 secured to the top 20 by fasteners 24. The support 22 may be secured to the brackets 23 by fasteners 25 (Fig. 2). A relatively wide longitudinal supporting rail 26 is attached to the upper edge of the support 22 so that, when the inner longitudinal edges of the trays 17 are seated against the rail 26 and the lower longitudinal edges upon the top 20, the trays will be supported in inclined positions.

Along each longitudinal margin of the top 20, a pair of spaced strips 27 and 28 are attached, their outer ends being connected by cross strips 29. The strips 27, 28 and 29 cooperate with the top 20 to form an open compartment 30 adapted to receive and retain eggs that are set aside or discarded as unfit for hatching and, therefore, not placed within the trays. The strips 27 cooperate directly with the support 22 and rail 26 to provide means for supporting the trays 17 in inclined positions above the top. The lower longitudinal corners of the trays 17 are placed upon the top 20 and against the strips 27, and the trays are thereby supported with their upper longitudinal edges upon the rail 26. The relatively wide rail 36 permits a tray to be supported at each side of the support 22 with their adjacent edges out of contact so that neither tray interferes with the other. Thus, the trays are held in inclined positions so that the eggs may be conveniently placed therein with the smaller ends of the eggs extended downwardly, and prevented from rolling or becoming displaced. After the trays are successively filled with eggs, they are removed from the frame top and slipped into the rack onto appropriate supporting angle bars 16. When the rack has been filled to the extent desired, it may be easily moved adjacent to an incubator, and the trays, filled with selected eggs, removed from the rack and placed therein.

Supports for cartons or receptacles containing eggs may be provided at the ends of the rack. As shown, a shelf 31 is connected with each pair of corner uprights by hinges 32 and provided with toggle braces 33 connecting said shelves with the corner uprights and adjustable to support the shelves extended horizontally as shown, or to permit the shelves to be folded downwardly according to well understood practice.

A weighing scale 34 is connected with one end of the support 22 by a hinge 35, and may be supported in position for use by a curved arm 36 and a clamp 37. The scale includes a small tray 38 adapted to receive and retain an egg placed therein so that, when the scale is operated by the egg, its weight may be visually noted. If the egg is underweight or overweight, it may be discarded as unsuitable and placed within one of the compartments 30. Thus, the device includes means for conveniently testing the eggs before they are placed in the trays, and means for receiving and retaining the discards, all within a unitary device for holding the trays in position to prevent rolling or displacement of the eggs that are placed therein and for receiving the filled trays and transporting them to the incubator.

The construction and arrangement of the device may be varied within the scope of equivalent limits without departure from the nature and principle thereof.

I claim:

An egg rack of the character described comprising a supporting frame, a top attached to the upper end of said frame, a vertical relatively thin support attached to said top, a relatively wide rail secured to the upper edge of said support, a strip attached to at least one longitudinal edge of said top, and a second strip attached to said top and spaced inwardly from said first strip and cooperating therewith to form a compartment adapted to receive and retain eggs, the inner one of said strips being parallel with said rail and constituting an abutment adapted to engage the lower side edge of an egg tray having its opposite side edge seated on said rail and cooperating with said rail to hold said tray in an inclined position.

HILBERT C. BROCKMEIER.